(12) United States Patent
Otani et al.

(10) Patent No.: US 11,509,573 B2
(45) Date of Patent: Nov. 22, 2022

(54) CONTROL DEVICE AND CONTROL METHOD

(71) Applicant: Nippon Telegraph and Telephone Corporation, Tokyo (JP)

(72) Inventors: Ikuo Otani, Tokyo (JP); Noritaka Horikome, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/977,139

(22) PCT Filed: Feb. 21, 2019

(86) PCT No.: PCT/JP2019/006614
§ 371 (c)(1),
(2) Date: Sep. 1, 2020

(87) PCT Pub. No.: WO2019/167802
PCT Pub. Date: Sep. 6, 2019

(65) Prior Publication Data
US 2021/0051097 A1 Feb. 18, 2021

(30) Foreign Application Priority Data
Mar. 2, 2018 (JP) .............................. JP2018-037025

(51) Int. Cl.
*H04L 45/42* (2022.01)
*H04L 45/24* (2022.01)
*H04L 45/00* (2022.01)
*H04L 45/586* (2022.01)

(52) U.S. Cl.
CPC .............. *H04L 45/42* (2013.01); *H04L 45/24* (2013.01); *H04L 45/566* (2013.01); *H04L 45/586* (2013.01)

(58) Field of Classification Search
CPC ............ H04L 45/42; H04L 49/90; G06F 9/38
See application file for complete search history.

(56) References Cited

U.S. PATENT DOCUMENTS 8,127,084 B2 * 2/2012 Gill ..................... G06F 12/0804
711/143
11,093,468 B1 * 8/2021 Bent ................... G06F 16/2237
(Continued)

FOREIGN PATENT DOCUMENTS

JP  2011-160041  8/2011
JP  2013-105308  5/2013
(Continued)

*Primary Examiner* — Mahran Y Abu Roumi
(74) *Attorney, Agent, or Firm* — Fish & Richardson P.C.

(57) ABSTRACT

[Problem] Change the distribution logic flexibly.
[Solution] A control apparatus includes a communication unit (NIC20) configured to receive a packet from a network, a plurality of first control units (3a, 3b, 3c, 3d) configured to function as a plurality of virtual control units (VM1a, 1b, 1c, ... ), a distribution circuit (Balancer 10a) configured to distribute the received packet to a plurality of dispatchers, a plurality of second control units (Dispatcher 4a, 4b, 4c, and 4d) configured to distribute the packet distributed by the distribution circuit to the plurality of virtual control units (VM1a, 1b, 1c, ... ), in which the distribution circuit is configured by a PLD.

9 Claims, 6 Drawing Sheets

(56) References Cited

U.S. PATENT DOCUMENTS

| | | | |
|---|---|---|---|
| 2005/0141568 A1* | 6/2005 | Kwak | H04J 3/1617 370/539 |
| 2008/0219253 A1* | 9/2008 | Pozhenko | H04L 47/2475 370/389 |
| 2010/0274890 A1* | 10/2010 | Patel | H04L 43/08 709/224 |
| 2013/0042317 A1* | 2/2013 | Nakashima | H04L 47/125 726/13 |
| 2013/0054813 A1* | 2/2013 | Bercovici | G06F 9/4856 709/226 |
| 2013/0226764 A1* | 8/2013 | Battyani | G06Q 30/0201 705/37 |
| 2014/0280836 A1* | 9/2014 | Kumar | H04L 49/15 709/223 |
| 2014/0281385 A1* | 9/2014 | Tu | G06F 9/3885 712/43 |
| 2015/0074222 A1* | 3/2015 | Liang | H04L 67/288 709/214 |
| 2015/0365330 A1* | 12/2015 | Pandey | H04L 47/2441 370/235 |
| 2016/0315634 A1* | 10/2016 | Mei | H03M 13/09 |
| 2017/0155529 A1* | 6/2017 | Aung | H04L 7/02 |
| 2019/0166003 A1* | 5/2019 | Shelke | H04L 41/046 |
| 2021/0209055 A1* | 7/2021 | Winston | G06F 8/314 |
| 2021/0279148 A1* | 9/2021 | Coleman | H04L 67/1097 |

FOREIGN PATENT DOCUMENTS

| | | |
|---|---|---|
| JP | 2014-32530 | 2/2014 |
| JP | 2014-106728 | 6/2014 |
| JP | 2017-139597 | 8/2017 |
| JP | 2017-220846 | 12/2017 |

\* cited by examiner

CONTROL DEVICE AND CONTROL METHOD

CROSS-REFERENCE TO RELATED APPLICATIONS

This application is a National Stage application under 35 U.S.C. § 371 of International Application No. PCT/JP2019/006614, having an International Filing Date of Feb. 21, 2019, which claims priority to Japanese Application Serial No. 2018-037025, filed on Mar. 2, 2018. The disclosure of the prior application is considered part of the disclosure of this application, and is incorporated in its entirety into this application.

TECHNICAL FIELD

The present disclosure relates to a control apparatus and a control method.

BACKGROUND ART

Disclosed is a technology in which a load balancer (Balancer) distributes processing requests (packets) to a plurality of dispatchers, and the plurality of dispatchers distribute the distributed processing requests to the same number of servers (CPU) as the dispatchers, and the server to which the processing request is distributed executes processing (see Patent Literature 1). Patent Literature 1 also describes that "when the load balancer B acquires a processing request from the external apparatus 5, the load balancer B distributes the processing request to one of the plurality of dispatchers D (D1, D2, and D3) in a round-robin fashion".

CITATION LIST

Patent Literature

Patent Literature 1: JP 2014-032530 (paragraph [0033], FIG. 2)

SUMMARY OF THE INVENTION

Technical Problem

Here, the load balancer described in Patent Literature 1 does not disclose whether a physical CPU is mounted and realized by software, or whether the load balancer is realized by a hardware logic without mounting a physical CPU. If the load balancer is configured by dedicated hardware, the speed of the load balancer would be higher than the one that is realized by software, while distribution logic and the number of distribution destinations would have to be fixed.

The present disclosure has been made to solve such problems, and its object is to provide a control apparatus and a control method capable of flexibly changing the distribution logic.

Means for Solving the Problem

A disclosure according to claim 1 is a control apparatus which includes a communication unit (for example, NIC) configured to receive packets from a network, a plurality of first control units configured to function as a plurality of virtual control units (for example, VM1a, 1b, . . . ), a distribution circuit (Balancer 10a, for example) configured to distribute the received packets to a plurality of dispatchers, a plurality of second control units (for example, Dispatcher 4a, . . . ) configured to distribute the packets distributed by the distribution circuit to the plurality of virtual control units, in which the distribution circuit is configured by a Programmable Logic Device (PLD).

According to this configuration, the packets received by the distribution circuit are distributed to the second control units. Then, the second control units distribute the distributed packets to the plurality of virtual control units. The plurality of second control units are provided by the distribution circuit, and thus the number of first control units constituting the plurality of virtual control units can be increased.

Here, the distribution circuit configured by the PLD distributes the packets to the plurality of second control units, and thus the distribution circuit is more flexible than the one configured by dedicated hardware, and the distribution logic can be changed on a case-by-case basis. Higher speed can be realized than distributing packets by software. One or both of the first control unit and the second control unit can be configured as a CPU core or a function unit of a CPU device.

A disclosure according to claim 2 provides the control apparatus described in claim 1, in which the distribution circuit includes multiple types of distribution units that are switchable, and the multiple types of distribution units are switched by setting or control by a management unit.

According to this configuration, multiple types of distribution units are switched to any of the multiple types of distribution units on a case-by-case basis. That is, the distribution logic can be flexibly changed.

A disclosure according to claim 3 provides the control apparatus described in claim 1, in which the distribution circuit includes a plurality of first output units that are connected to the plurality of second control units in a one-to-one relationship, and a second output unit that is not connected to the plurality of second control units, and the control apparatus further includes a management unit configured to manage which of the plurality of first output units and the second output unit is to be a distribution path.

According to this configuration, the distribution circuit can include a number of output units (for example, output unit of the CPU_IF function unit 11) larger than the number of the second control units (for example, Dispatchers). That is, in the distribution circuit, the maximum number of output units (first output unit or second output unit) can be configured up to the hardware limit.

A disclosure according to claim 4 provides the control apparatus described in claim 1, in which the distribution circuit includes a plurality of first output units that are connected to the plurality of second control units in a one-to-one relationship, and a second output unit that is not connected to the plurality of second control units, and an output signal path of the second output unit is blocked.

According to this configuration, in the distribution circuit, the maximum number of output units (first output unit or second output unit) can be configured up to the hardware limit.

A disclosure according to claim 5 provides the control apparatus described in claim 3 or 4, in which the distribution circuit may re-distribute a packet to be transmitted to the second output unit to the plurality of first output units in a round-robin fashion.

According to this configuration, the plurality of first output units causes the load of the second control units connected in a one-to-one relationship to be distributed. The second output unit has no load.

A disclosure according to claim 6 provides the control apparatus described in claim 1, in which the distribution circuit includes a plurality of first output units connected to any of the plurality of second control units in a one-to-one relationship and a plurality of second output units connected to the other second control units, and any of the other second control units is configured to merge signals from the plurality of second output units.

According to this configuration, even if the sum of the number of the first output units and the number of the second output units is larger than the number of the second control units, all the output units (first output unit and second output unit) can be used.

A disclosure according to claim 7 provides the control apparatus described in claim 1, in which any of the plurality of second control units (for example, Dispatcher) distributes the packets to the virtual control unit connected to the second control unit itself and distributes the packets to other virtual control units connected to the other second control units.

According to this configuration, any of the second control units distributes the packets to the other virtual control units through the other second control units or distributes the packets to the other virtual control units without passing through the other second control unit.

A disclosure according to claim 8 is a control method executed by a control apparatus including a communication unit configured to receive packets from a network, a distribution circuit which is configured to distribute the received packets to a plurality of dispatchers and configured by a PLD, and a plurality of control units configured to process the packets distributed by the distribution circuit, the control method includes reconfiguring the PLD to a different type of a distribution unit.

According to this configuration, the PLD is reconfigured to any of the multiple types of distribution units (for example, Balancer function unit A12*a*, Balancer function unit B12*b*, Balancer function unit C12*c*, and Balancer function unit D12*d*). That is, in the distribution circuit, the distribution logic can be changed on a case-by-case basis.

The distribution circuit switches to any of the first output units based on the contents of a specific field of the packet, and each second control unit can realize a distribution function of distributing packets to each virtual control unit using an identifier.

Effects of the Invention

According to the present disclosure, a control apparatus capable of flexibly changing the distribution logic can be configured.

DESCRIPTION OF EMBODIMENTS

Figure 1:
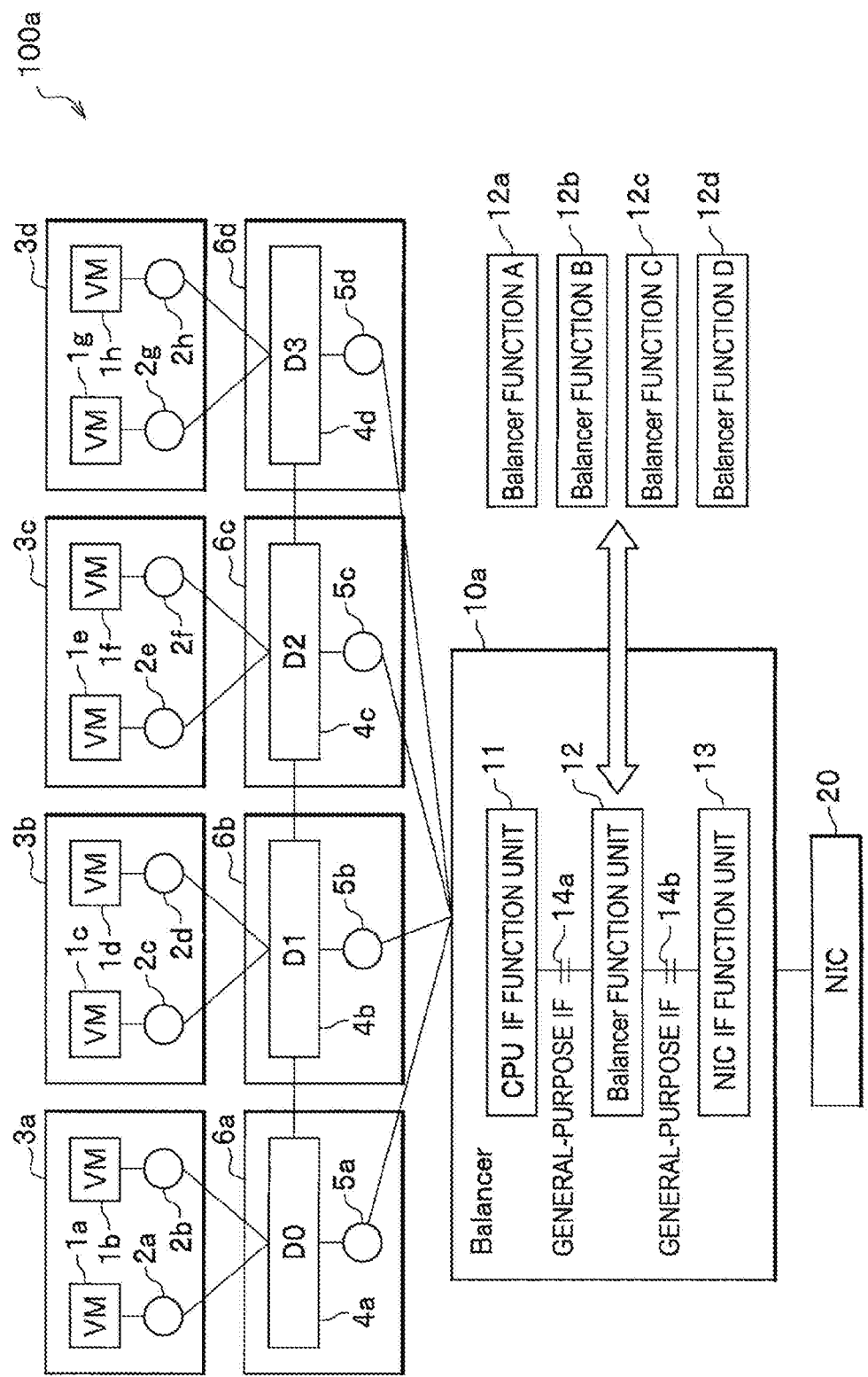
FIG. 1 is a configuration diagram of a control apparatus according to a first embodiment of the present disclosure.

Embodiments of the present disclosure (hereinafter, referred to as "present embodiment") will be described in detail below with reference to the drawings. The drawings are only schematically illustrated to the extent that the present disclosure can be sufficiently understood. In the drawings, common constituent elements and similar constituent elements are denoted by the same reference numerals, and redundant description thereof will be omitted.

First Embodiment

FIG. 1 is an overall configuration diagram of a control system, which is a first embodiment of the present disclosure.

A control apparatus 100*a* is configured to include a plurality of first control units 3*a*, 3*b*, 3*c*, and 3*d*, second control units 6*a*, 6*b*, 6*c*, and 6*d* having the same number as the first control units, a Balancer 10*a* as a distribution circuit, and an NIC 20 as a communication unit.

The first control unit 3*a* is a CPU core as a physical central processing unit (CPU), and realizes the functions of virtual control units 1*a* and 1*b* which are a plurality of Virtual Machines (VMs) and first buffers 2*a* and 2*b* which are a plurality of queues by executing a program (program module). The virtual control units 1*a* and 1*b* are virtual computers operating on a hypervisor. The first buffers 2*a* and 2*b* are queues for outputting signals (packets) distributed from the second control unit 6*a* to the virtual control units 1*a* and 1*b* on a first-in first-out basis.

The second control unit 6*a* is a CPU core as a physical CPU, and realizes the functions of a Dispatcher 4*a* and the second buffer 5*a*, which is a queue, by executing a program. One or both of the plurality of first control units 3*a*, 3*b*, 3*c*, and 3*d* and the same number of second control units 6*a*, 6*b*, 6*c*, and 6*d* as the first control units can also be realized as a function unit of a CPU core, and can also be realized as a function unit of a CPU device in which plurality of CPU cores are built.

The Dispatcher 4*a* has a function of distributing the packets to the virtual control units 1*a* and 1*b* for example, based on an identifier such as a destination IP address. Similarly, the first control unit 3*b* realizes functions of a plurality of virtual control units 1*c* and 1*d* and a plurality of first buffers 2*c* and 2*d*. The second control unit 6*b* realizes the functions of a Dispatcher 4*b* and a second buffer 5*b*. The first control unit 3*c* realizes the functions of a plurality of virtual control units 1*e* and 1*f* and a plurality of first buffers 2*e* and 2*f*. The second control unit 6*c* realizes the functions of a Dispatcher 4*c* and a second buffer 5*c*. The first control unit 3*d* realizes the functions of a plurality of virtual control units 1*g* and 1*h* and a plurality of first buffers 2*g* and 2*h*. The second control unit 6*d* realizes the functions of a Dispatcher 4*d* and a second buffer 5*d*. The NIC 20 is a network interface card, and is a communication unit connected to a network such as a Local Area Network (LAN) and a Wide Area Network (WAN).

The Balancer 10*a* is a distribution circuit configured to include a CPU_IF function unit 11, a Balancer function unit 12, an function unit 13, and a general-purpose IFs 14*a* and 14*b*. The CPU_IF function unit 11 is hardware that includes four output units and controls an interface with the second control units 6*a*, 6*b*, 6*c*, and 6*d*. As in a control apparatus 100*e* (FIG. 5) according to a fifth embodiment described later, the CPU_IF function unit 11 may be configured by a CPU that realizes a function such as a round-robin fashion.

The NIC_IF function unit 13 is hardware that manages an interface with the NIC 20. The general-purpose IFs 14a and 14b are general-purpose queues. In particular, the general-purpose IF 14a is a First In First Out (FIFO) memory (hardware) that relays between the CPU_IF function unit 11 and the Balancer function unit 12. The general-purpose IF 14b is a FIFO memory that relays between the Balancer function unit 12 and the NIC_IF function unit 13.

The Balancer function unit 12 is hardware that distributes a packet received by the NIC 20 to a plurality of dispatchers, and is a distribution unit configured by a programmable logic device (PLD), for example, a field programmable gate array (FPGA). Then, the distributed packets are output to the four second buffers 5a, 5b, 5c, and 5d via the general-purpose IF 14a and the CPU_IF function unit 11. The Balancer function unit 12 can realize any distribution logic by using the PLD. That is, the function of the Balancer function unit 12 can be changed to any of the different types of Balancer function units (distribution units) such as a Balancer function unit A12a, a Balancer function unit B12b, a Balancer function unit C12c, and a Balancer function unit D12d. The function of the Balancer function unit 12 can be changed on a case-by-case basis by reconfiguring the Gate Array using an FPGA.

For example, if the Balancer function unit 12 can see a specific field of a packet and process the packet in the same flow, the Balancer function unit 12 distributes the packet to the same destination, or distributes the packet regardless of the nature of the packet, such as a round-robin fashion. The packet that is distributed to the same distribution destination can be said to have high directivity, and a round-robin fashion at which the distribution destination is random can be said to have low directivity. If the packet that can be processed in the same flow is distributed to the same distribution destination, the distribution is low in randomness, and the packet can be distributed to the static virtual control unit (VM). If the distribution is performed irrespective of the nature of the packet, the distribution is high in randomness, and the distribution can be effectively performed when the number and the location of placement of the virtual control units (VMs) dynamically vary.

The Balancer function unit 12 includes Balancers having different functions such as the Balancer function unit A12a, the Balancer function unit B12b, the Balancer function unit C12c, and the Balancer function unit D12d and may be configured to be able to switch between the function units by setting options.

As described above, in the control apparatus 100a of the present embodiment, the Balancer function unit 12 is configured by FPGA hardware, and thus the Balancer function unit 12 can be reconfigured on a case-by-case basis, or can be switched to any of the plurality of Balancer function units 12a, 12b, 12c, and 12d by setting options.

Second Embodiment

The Balancer 10a of the control apparatus 100a according to the first embodiment includes the Balancer function unit 12, and this was based on the assumption that the number of the Balancer function unit 12, which is capable of distributing a packet, is equal to the number of the second control units 6a, 6b, 6c, and 6d. In the present embodiment, it is assumed that the number of the Balancer function unit 12, which is capable of distributing a packet, is larger than the number of the second control units 6a, 6b, 6c, and 6d.

Figure 2:
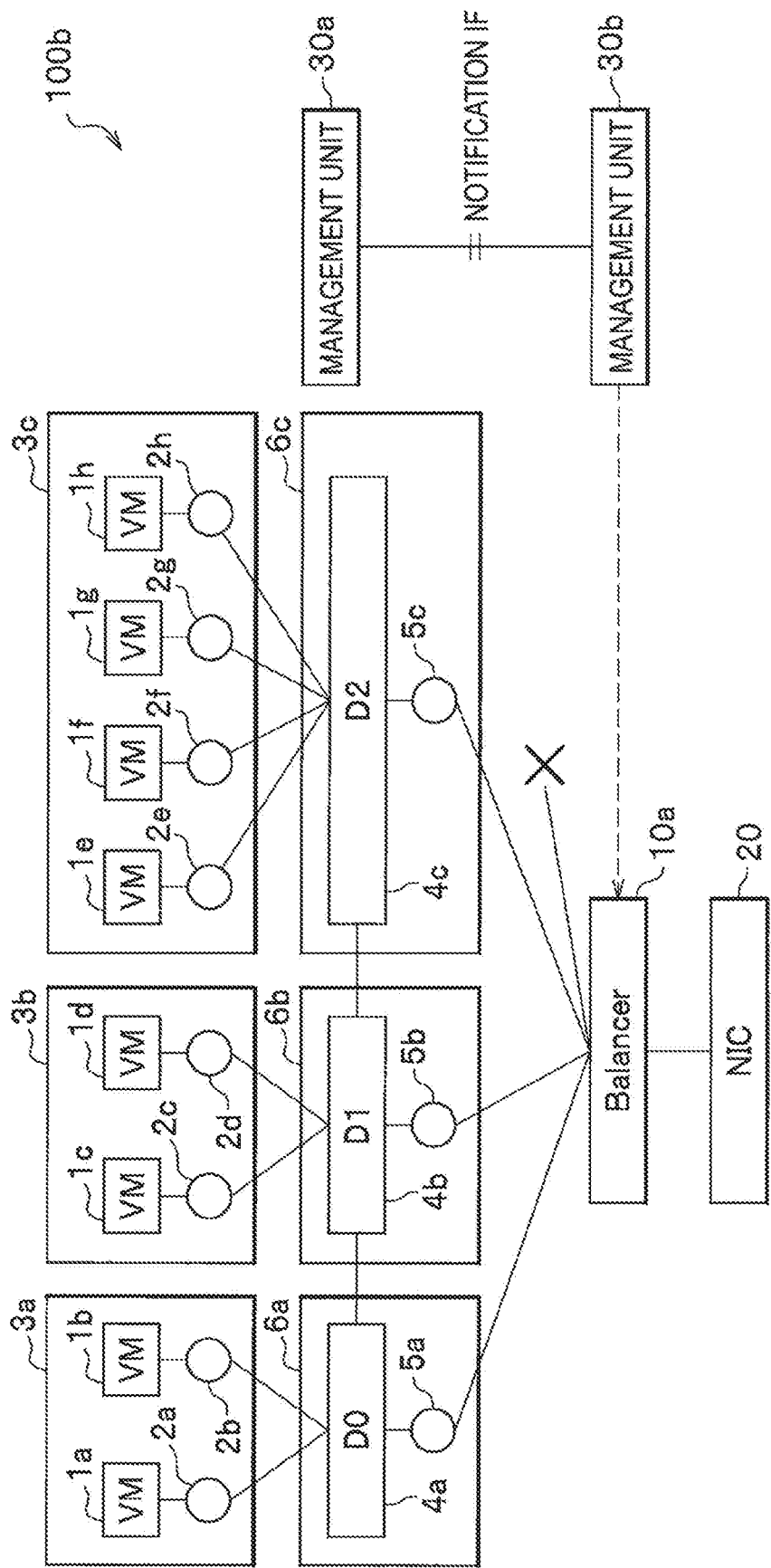
FIG. 2 is a configuration diagram of a control apparatus according to a second embodiment of the present disclosure.

FIG. 2 is a configuration diagram of a control apparatus according to a second embodiment of the present disclosure.

Similar to the control apparatus 100a of the first embodiment, a control apparatus 100b includes a plurality of first control units 3a, 3b, and 3c, and the same number of second control units 6a, 6b, and 6c as that of the first control units, the Balancer 10a as a distribution circuit, and the NIC 20 as a communication unit. Here, the first control unit 3c realizes the functions of a plurality of virtual control units 1e, 1f, 1g, and 1h and a plurality of first buffers 2e, 2f, 2g, and 2h. The number of virtual control units is larger than that of the first control units 3a and 3b, and thus light control can be performed in parallel. The second control unit 6c realizes the functions of a Dispatcher 4c and a second buffer 5c.

Here, it is assumed that the Balancer 10a includes a number of the Balancer function unit 12 (FIG. 1), which is capable of distributing a packet, is larger than the number of the second control units 6a, 6b, and 6c. That is, the Balancer 10a includes a first output unit (distribution path) connected to the second control units 6a, 6b, and 6c in a one-to-one relationship, and a second output unit (distribution path) not connected to the second control units 6a, 6b, and 6c. Furthermore, the control apparatus 100b is configured to include a management unit 30a that manages the second control units 6a, 6b, and 6c, a management unit 30b that manages the Balancer 10a, and a notification IF that communicably connects the management unit 30a and the management unit 30b.

The management units 30a and 30b designate the function of the Balancer 10a. Specifically, the management units 30a and 30b have a function of designating a second output unit of the Balancer function unit 12 (FIG. 1) as a distribution unit. Here, the number of the second control units 6a, 6b, and 6c is three, and thus the management units 30a and 30b allows the Balancer function unit 12 to use three first output units connected to the second control units 6a, 6b, and 6c. That is, the management units 30a and 30b change the number of interfaces (output units) without changing the circuit of the Balancer 10a. The Balancer function unit 12 includes Balancer having different functions such as the Balancer function unit A12a, the Balancer function unit B12b, the Balancer function unit C12c, and the Balancer function unit D12d and may be configured so that the management units 30a and 30b switch between the function units.

According to the control apparatus 100b, the Balancer 10a can configure the maximum number of Balancer function units 12, which are capable of distributing a packet, by the FPGA. Then, the first output unit connected to the second control units 6a, 6b, and 6c is used, and the second Output unit not connected to the second control units 6a, 6b, 6c and is unused.

Third Embodiment

In the second embodiment, the management units 30a and 30b make a part of the distribution interfaces of the Balancer function unit 10a unused, but a configuration in which the packet is not transmitted to any of the second control units 6a, 6b, and 6c connected to the Balancer 10a may be allowed.

Figure 3:
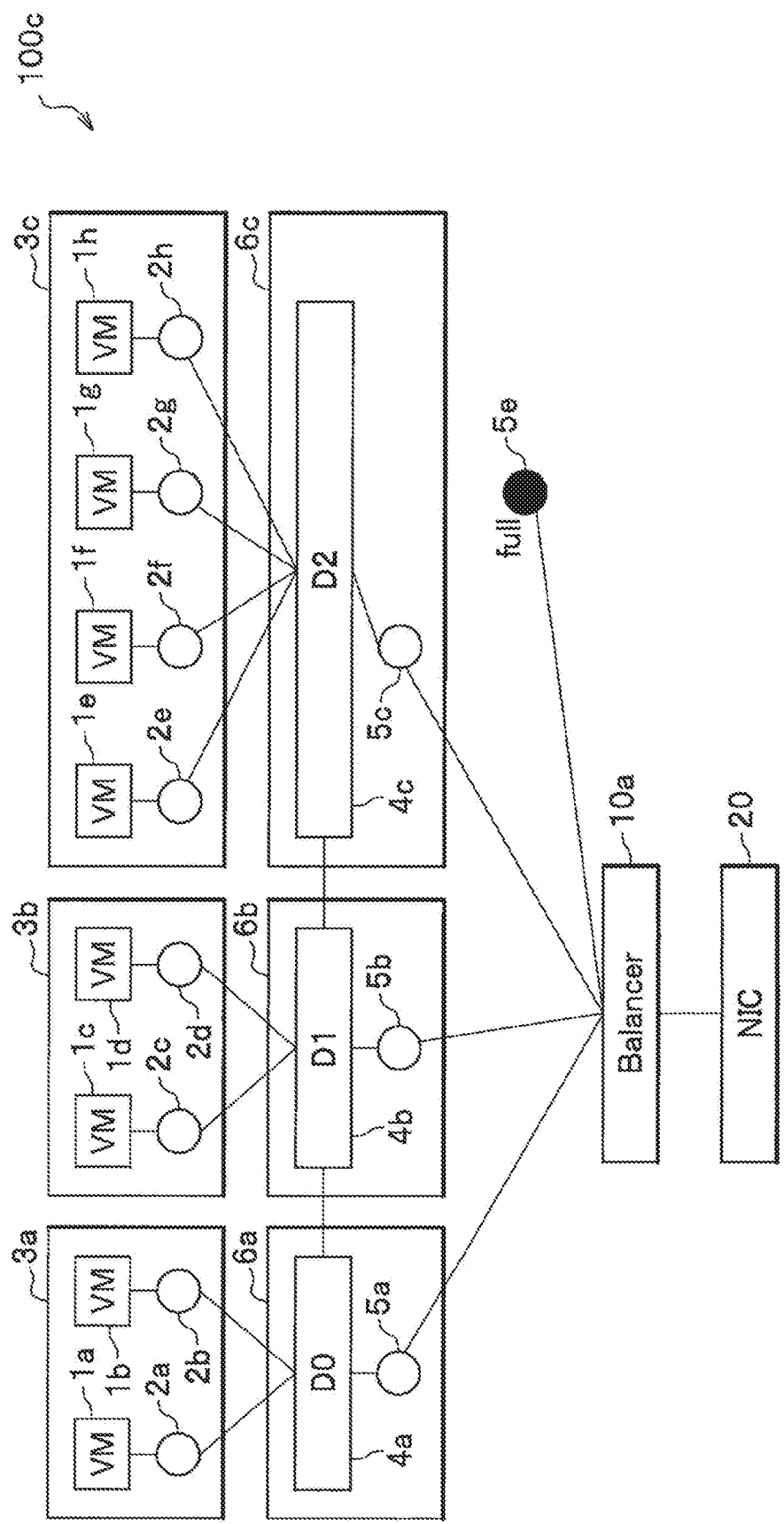
FIG. 3 is a configuration diagram of a control apparatus according to a third embodiment of the present disclosure.

FIG. 3 is a configuration diagram of a control apparatus according to a third embodiment of the present disclosure. Similar to the second embodiment, a control apparatus 100c includes a plurality of first control units 3a, 3b, and 3c, and the same number of second control units 6a, 6b, and 6c as that of the first control units, the Balancer 10a including the Balancer function unit 12 (FIG. 1), a buffer 5e as a function unit, and the NIC 20 as a communication unit. Here, it is assumed that the number of Balancer function unit 12, which is capable of distributing a packet, is set to the maximum number of the capabilities of the FPGA. The second control unit 6c realizes the functions of a Dispatcher 4c and a second buffer 5c. The buffer 5e may be realized by a new control unit or any of the first control units 3a, 3b, and 3c and the second control units 6a, 6b, and 6c.

The Balancer 10a includes four output units, and is connected to the second buffer 5a of the second control unit 6a, the second buffer 5b of the second control unit 6b, the second buffer 5c of the second control unit 6c, and the buffer 5e. The buffer 5e stores a dummy "full", and is configured so that packets (information) are not transmitted from the Balancer 10a.

With this configuration, the Balancer 10a distributes packets to three buffers of the second control units for the second buffer 5a of the second control unit 6a, the second buffer 5b of the second control unit 6b, and the second buffer 5c of the second control unit 6c. The Balancer 10a reduces the number of interfaces without changing the circuit.

Fourth Embodiment

Although the control apparatus 100c of the third embodiment uses the second buffer 5c which is one of the second buffer 5c and the buffer 5e, the control apparatus 100c can use the second buffer 5c and the buffer 5e.

Figure 4:
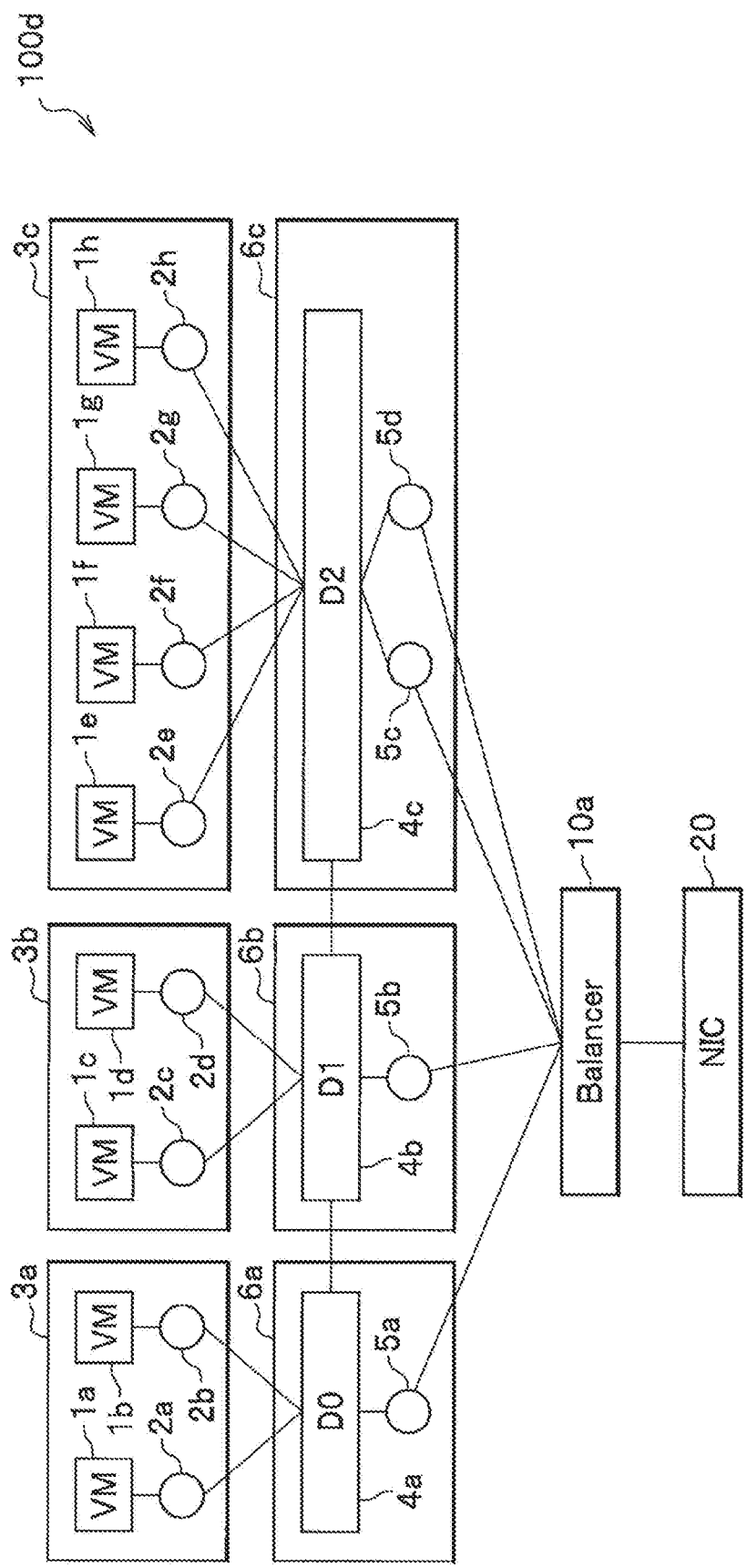
FIG. 4 is a configuration diagram of a control apparatus according to a fourth embodiment of the present disclosure.

FIG. 4 is a configuration diagram of a control apparatus according to a fourth embodiment of the present disclosure.

Similar to the third embodiment, a control apparatus 100d includes a plurality of first control units 3a, 3b, and 3c, and the same number of second control units 6a, 6b, and 6c as that of the first control units, the Balancer 10a including the Balancer function unit 12 (FIG. 1), and the NIC 20 as a communication unit. Here, the number of the Balancer function units 12 capable of distributing a packet is set to the maximum number of the capabilities of the FPGA. The second control unit 6c realizes the functions of the Dispatcher 4c and the plurality of second buffers 5c and 5d.

The Balancer 10a includes four output units, and is connected to the second buffer 5a of the second control unit 6a, the second buffer 5b of the second control unit 6b, and the two second buffers 5c and 5d of the second control unit 6c. The Dispatcher 4c merges (combines) packets (signals) received from the two second buffers 5c and 5d, and distributes the merged signal to the first buffers 2e, 2f, 2g, and 2h of the first control unit 3c.

For that reason, the Balancer function unit 12 (FIG. 1) of the Balancer 10a can distribute the packet without leaving a part of the distribution interfaces of the Balancer function unit 10a unused.

Fifth Embodiment

The control apparatus 100b of the second embodiment reduces the number of interfaces without changing the circuit of the Balancer 10a. The control apparatus 100c of the third embodiment is configured to store a dummy "full" in the second buffer Se so that information (packet) cannot be transmitted. In the case of the control apparatus 100c, the packet is transmitted to the second buffers 5a, 5b, and 5c.

Figure 5:
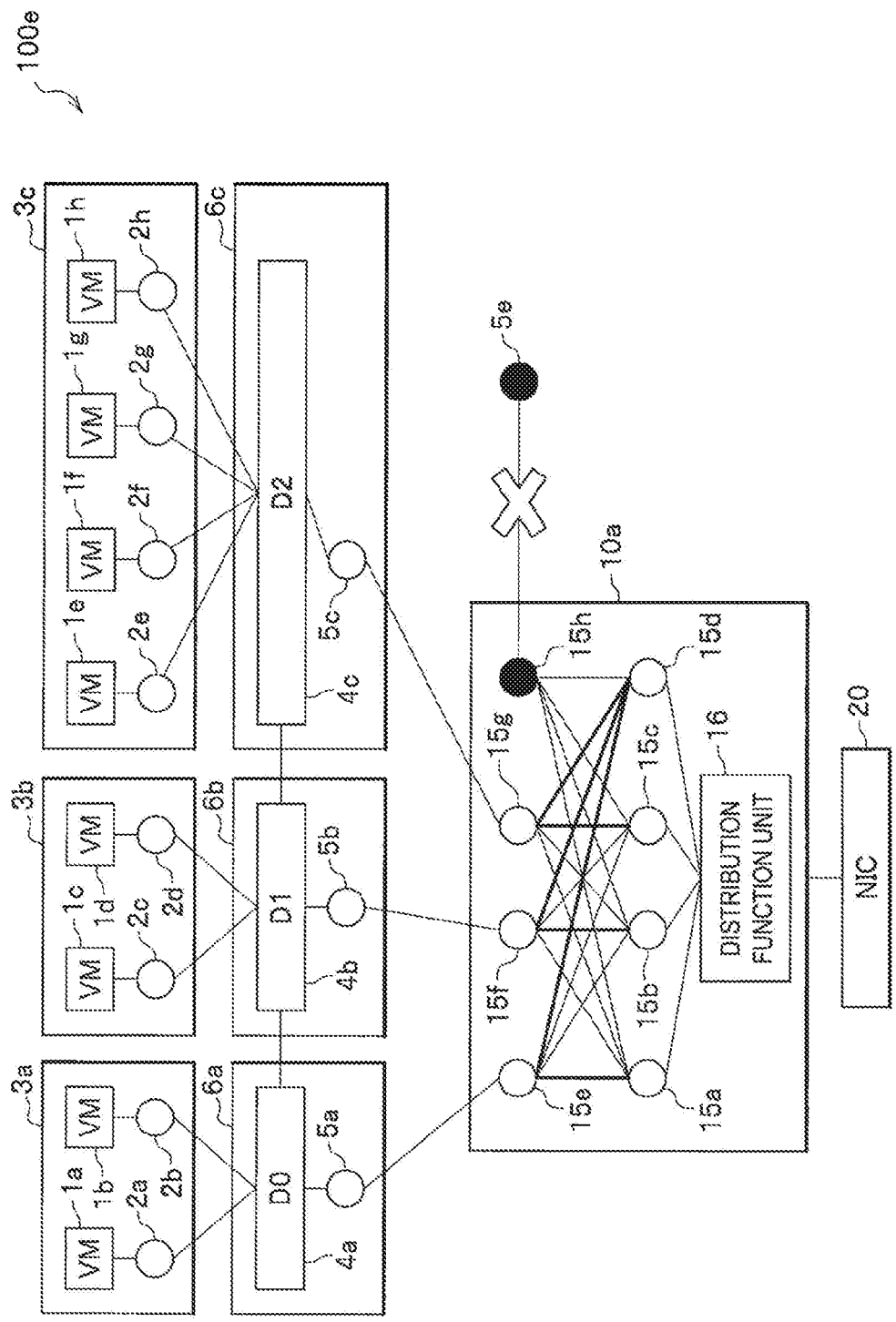
FIG. 5 is a configuration diagram of a control apparatus according to a fifth embodiment of the present disclosure.

FIG. 5 is a configuration diagram of a control apparatus according to a fifth embodiment of the present disclosure. Similar to the third embodiment, a control apparatus 100e includes a plurality of first control units 3a, 3b, and 3c, the same number of second control units 6a, 6b, and 6c as that of the first control units, the Balancer 10a including the Balancer function unit 12 (FIG. 1), the buffer 5e as a function unit, and the NIC 20 as a communication unit. The number of Balancer function units 12, which are capable of distributing a packet, is set to the maximum number of the capabilities of the FPGA. The second control unit 6c realizes the functions of a Dispatcher 4c and a second buffer 5c.

The Balancer 10a includes four output units, and is connected to the second buffer 5a of the second control unit 6a, the second buffer 5b of the second control unit 6b, the second buffer 5c of the second control unit 6c, and the buffer 5e. However, as in the third embodiment, the buffer 5e stores a dummy "full", and is configured so that information (packets) is not transmitted from the Balancer 10a.

The Balancer 10a is configured to include a plurality of third buffers 15a, 15b, 15c, and 15d, a plurality of fourth buffers 15e, 15f, 15g, and 15h, and a distribution function unit 16. Here, the plurality of third buffers 15a, 15b, 15c, and 15d and the plurality of fourth buffers 15e, 15f, 15g, and 15h correspond to the CPU_IF function 11 (FIG. 1) of the first embodiment. The fourth buffer 15h is connected to the buffer 5e in which the dummy "full" is stored, and thus the fourth buffer 15h cannot transmit a packet to the second control unit 6c.

The distribution function unit 16 distributes the packet received from the NIC 20 to the plurality of third buffers 15a, 15b, 15c, and 15d. That is, the distribution function unit 16 corresponds to the Balancer function unit 12 (FIG. 1) of the first embodiment. The packets distributed to the third buffers 15a, 15b, 15c, and 15d are transmitted to the fourth buffers 15e, 15f, 15g, and 15h in principle. However, the third buffer 15h cannot be used, and thus the packets distributed to the third buffers 15a, 15b, 15c, and 15d are distributed to the fourth buffers 15e, 15f, and 15g based on distribution logic such as a round-robin fashion.

For example, packets distributed to the third buffers 15a, 15b, and 15c are transmitted to the fourth buffers 15e, 15f, and 15g in principle. Furthermore, the packet distributed to the third buffer 15d should be distributed to the fourth buffer 15h, but is distributed to the other fourth buffers 15e, 15f, and 15g in a round-robin fashion. Then, the packets distributed to the fourth buffers 15e, 15f, and 15g are transmitted to the second buffers Sa, 5b, and 5c.

That is, the Balancer 10a avoids a mismatch between the number of functions of the distribution function unit 16 and the number of outputs (the number of the fourth buffers 15e, 15f, 15g, and 15h).

In the second embodiment, the management units 30a and 30b (FIG. 2) designate an unused distribution interface. Specifically, the management units 30a and 30b designate the buffer 15h as unused. With this configuration, the packets distributed to the third buffer 15d are distributed to the fourth buffers 15e, 15f, and 15g in a round-robin fashion.

Comparative Example

Figure 6:
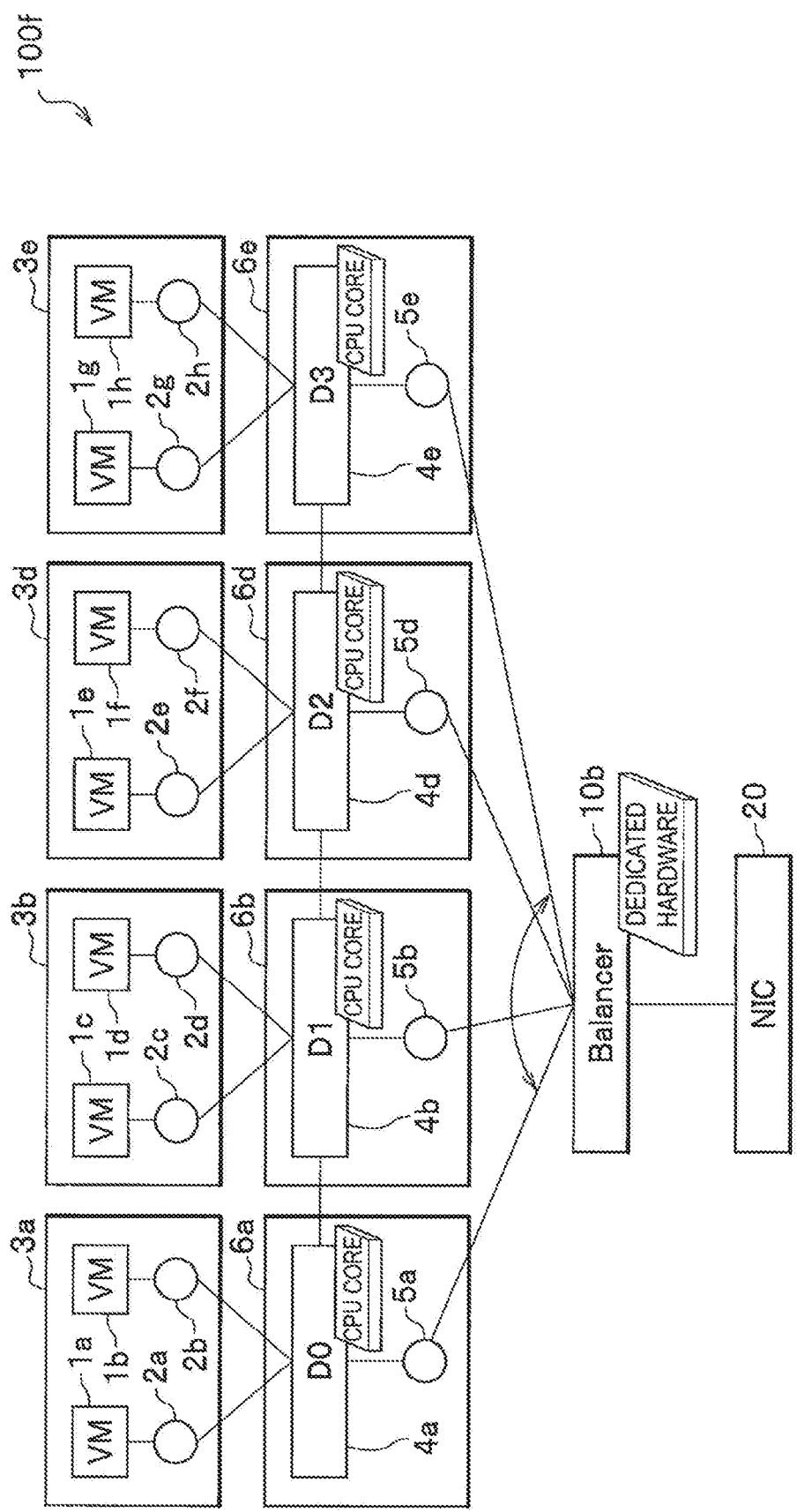
FIG. 6 is a configuration diagram of a control apparatus that is a comparative example of the present disclosure.

FIG. 6 is a configuration diagram of a control apparatus that is a comparative example of the present disclosure. Hereinafter, a control apparatus 100f will be compared with the control apparatuses 100a to 100e of the embodiments described above. The control apparatus 100f is configured to include a plurality of first control units 3a, 3b, 3d, and 3e, the second control units 6a, 6b, 6d, and 6e having the same number as the first control units, a Balancer 10b as a distribution circuit, and the NIC 20 as a communication unit.

The first control unit 3a is a CPU core as a physical CPU, and realizes the functions of the plurality of virtual control units 1a and 1b which are the plurality of first buffers 2a and 2b. The virtual control units 1a and 1b are virtual computers operating on a hypervisor. The first buffers 2a and 2b output signals (packets) distributed from the second control unit 6a to the virtual machines 1a and 1b on a first-in first-out basis.

The second control unit 6a is a CPU core as a physical CPU, and realizes the functions of the Dispatcher 4a and the second buffer 5a by executing a program. Similarly, the first control unit 3b realizes functions of a plurality of virtual control units 1c and 1d and a plurality of first buffers 2c and 2d. The second control unit 6b realizes the functions of a Dispatcher 4b and a second buffer 5b. The first control unit 3d realizes the functions of the plurality of virtual control units 1e and 1f and the plurality of first buffers 2e and 2f. The second control unit 6d realizes the functions of a Dispatcher 4d and a second buffer 5d. The first control unit 3e realizes the functions of the plurality of virtual control units 1g and 1h and the plurality of first buffers 2g and 2h. The second control unit 6e realizes the functions of the Dispatcher 4e and the second buffer 5e. The NIC 20 is a Network Interface Card, and is a communication unit connected to a network.

The Balancer 10b realized not by a PLD but by dedicated hardware, and realizes only a single distribution function. The Balancer 10b distributes the packet received by the NIC 20 to the second control units 6a, 6b, 6d, and 6e using fixed single logic.

The Balancer 10b is realized by dedicated hardware, and thus the Balancer 10b is high-speed, but the distribution logic and the number of distribution destinations are fixed. However, the Balancer 10a of the control apparatus 100a according to the first embodiment is configured by a PLD, for example, an FPGA. For that reason, the function of the balancer function unit 12 can be changed to any of the Balancer function unit A12a, the Balancer function unit B12b, the Balancer function unit C12c, and the Balancer function unit D12d by reconfiguring the Gate Array. The Balancer function unit 12 includes the Balancer function unit A12a, the Balancer function unit B12b, the Balancer function unit C12c, and the Balancer function unit D12d and can switch between the function units by setting options.

In the control apparatuses 100b, 100c, and 100d of the second, third, and fourth embodiments, the number of distribution functions of the Balancer 10a is different from the number of second control units 6a, 6b, and 6c that are distribution destinations.

Modified Example

The present disclosure is not limited to the embodiments described above, and for example, the following various modifications are possible.

(1) The first buffers 2a, 2b, 2c, 2d, 2e, 2f, 2g, and 2b and the second buffers 5a, 5b, 5c, 5d, and 5e of the embodiments described above have a function of performing first-in first-out, data may be written to a predetermined address and then extracted.

(2) The Dispatchers 4a, 4b, 4c, and 4d of the embodiments described above are allocated to a plurality of virtual control units (for example, virtual control units 1a and 1b of first control unit 3a) of the first control units 3a, 3b, 3c, and 3d connected to the Dispatchers 4a, 4b, 4c, and 4d. A configuration in which the Dispatcher 4a is allocated to any of all the virtual control units 1a, 1b 1c, 1d, 1e, 1f, 1g, and 1h and the other dispatchers 4b, 4c, and 4d are allocated to any of all the virtual control units 1a, 1b 1c, 1d, 1e, 1f, 1a, and 1h may be allowed.

(3) The Dispatchers 4a, 4b, 4c, and 4d of the embodiments described above are allocated to a plurality of virtual control units of the first control units 3a, 3b, 3c, and 3d (for example, the virtual control units 1a and 1b of the first control unit 3a) connected respectively to the Dispatchers 4a, 4b, 4c, and 4d. Each of the Dispatchers 4a, 4b, 4c, and 4d may be allocated not only to the plurality of virtual control units of the first control units 3a, 3b, 3c, and 3d connected to the Dispatchers 4a, 4b, 4c, and 4d but also to other Dispatchers (for example, the Dispatcher 4a is allocated to the Dispatcher 4b, 4c, or 4d).

REFERENCE SIGNS LIST 1, 1a, 1b 1c, 1d, 1e, 1f, 1g, 1h virtual control unit
2, 2a, 2b, 2c, 2d, 2e, 2f, 2g, 2h first buffer (queue)
3, 3a, 3b, 3c first control unit
4, 4a, 4b, 4c, 4d Dispatcher
5, 5a, 5b, 5c, 5d second buffer (queue)
5e buffer (full)
6, 6a, 6b, 6c, 6d second control unit
7a, 7b, 7c, third control unit
10a Balancer (distribution circuit, PLD, FPGA)
10b Balancer (dedicated hardware)
11 CPU_IF function unit (first output unit, second output unit)
12 Balancer function unit
12a, 12b, 12c, 12d Balancer function unit (distribution unit)
13 NIC_IF function unit
14a, 14b general-purpose IF (queue)
15a, 15b, 15c, 15d third buffer
15e, 15f, 15g, 15h fourth buffer
16 distribution function unit
20 NIC (communication unit)
30a, 30b management unit
100a, 100b, 100c, 100d, 100e, 100f, 100g control apparatus

The invention claimed is:

1. A control apparatus comprising:
a network interface configured to receive a packet from a network;
a plurality of first control units, including one or more first processors, configured to function as a plurality of virtual control units;
a distribution circuit, implemented with a programmable logic device (PLD) including a programmable gate array, configured to distribute the received packet to a plurality of dispatchers, wherein the PLD is configured to reconfigure the distribution circuit;
a plurality of second control units, including one or more second processors, configured to function as the plurality of dispatchers and distribute the packet distributed by the distribution circuit to the plurality of virtual control units,
wherein:
the distribution circuit includes a plurality of first output units that are connected to the plurality of second control units in a one-to-one relationship, and a second output unit that is not connected to the plurality of second control units,
the second output unit is connected to a buffer storing data configured to prevent information to be transmitted from the second output unit,
each of the plurality of second control units includes at least one respective buffer, a first subset of the plurality of first output units are connected to the respective buffers of some of the plurality of second control units in a one-to-one relationship, and a second subset of the plurality of first output units are connected to the respective buffers of the other second control units, and at least one of the other second control units includes a plurality of buffers connected to the second subset of the plurality of first output units, and is configured to merge signals from the plurality of second output units.

2. The control apparatus according to claim 1,
wherein the distribution circuit includes multiple types of distribution units that are switchable by setting or control by a management unit.

3. The control apparatus according to claim 1,
the control apparatus further comprises a management unit, including one or more third processors, configured to manage which of the plurality of first output units and the second output unit is to be included in a distribution path.

4. The control apparatus according to claim 1,
wherein the distribution circuit is configured to re-distribute a packet to be transmitted to the second output unit to the plurality of first output units in a round-robin fashion.

5. A control method executed by a control apparatus including a network interface configured to receive a packet from a network, a distribution circuit which is implemented with a programmable logic device (PLD) including a programmable gate array and configured to distribute the received packet to a plurality of dispatchers, and a plurality of control units configured to process the packet distributed by the distribution circuit, the control method comprising:

reconfiguring the PLD to a different type of distribution unit, wherein the distribution circuit includes a plurality of first output units that are connected to the plurality of control units in a one-to-one relationship, and a second output unit that is not connected to the plurality of control units, the second output unit is connected to a buffer storing data configured to prevent information to be transmitted from the second output unit, each of the plurality of second control units includes at least one respective buffer, a first subset of the plurality of first output units are connected to the respective buffers of some of the plurality of second control units in a one-to-one relationship, and a second subset of the plurality of first output units are connected to the respective buffers of the other second control units, and at least one of the other second control units includes a plurality of buffers connected to the second subset of the plurality of first output units, and is configured to merge signals from the plurality of second output units.

6. A control method executed by a control apparatus including a network interface, a plurality of first control units configured to function as a plurality of virtual control units, a distribution circuit implemented with a Programmable Logic Device (PLD) including a programmable gate array, and a plurality of second control units configured to function as a plurality of dispatchers, wherein the control method comprises:

receiving, by the communication unit, a packet from a network;

distributing, by the distribution circuit, the received packet to a plurality of dispatchers; and distributing, by the plurality of second control units, the packet distributed by the distribution circuit to the plurality of virtual control units;

wherein:

the distribution circuit includes a plurality of first output units that are connected to the plurality of second control units in a one-to-one relationship, and a second output unit that is not connected to the plurality of second control units, the second output unit is connected to a buffer storing data configured to prevent information to be transmitted from the second output unit, each of the plurality of second control units includes at least one respective buffer, a first subset of the plurality of first output units are connected to the respective buffers of some of the plurality of second control units in a one-to-one relationship, and a second subset of the plurality of first output units are connected to the respective buffers of the other second control units, and at least one of the other second control units includes a plurality of buffers connected to the second subset of the plurality of first output units, and is configured to merge signals from the plurality of second output units.

7. The control method according to claim 6,
wherein the distribution circuit includes multiple types of distribution units that are switchable by setting or control by a management unit.

8. The control method according to claim 6,
wherein the control apparatus further comprises a management unit configured to manage which of the plurality of first output units and the second output unit is to be included in a distribution path.

9. The control method according to claim 6,
wherein the distribution circuit is configured to re-distribute a packet to be transmitted to the second output unit to the plurality of first output units in a round-robin fashion.

* * * * *